Oct. 17, 1972     G. NIEMANN     3,698,961
SEALED BATTERY WITH SYNTHETIC RESIN CASE AND COVER
Filed Jan. 21, 1971     2 Sheets-Sheet 1

INVENTOR
GERT NIEMANN

BY

ATTORNEY

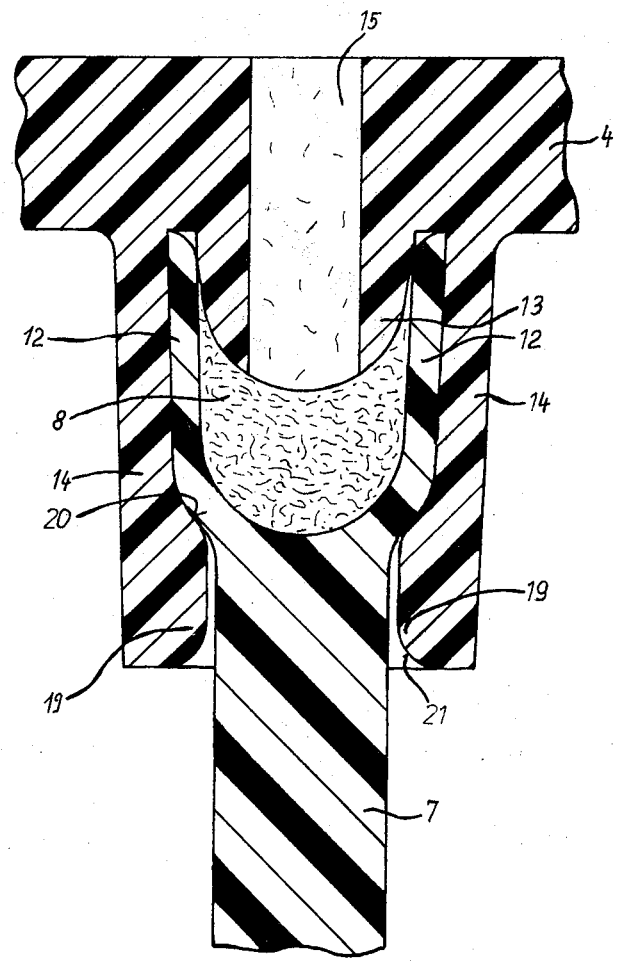

United States Patent Office 3,698,961
Patented Oct. 17, 1972

3,698,961
SEALED BATTERY WITH SYNTHETIC RESIN
CASE AND COVER
Gert Niemann, Hildesheim, Germany, assignor to Robert
Bosch GmbH, Stuttgart, Germany
Filed Jan. 21, 1971, Ser. No. 108,405
Claims priority, application Germany, Jan. 29, 1970,
P 20 03 919.4; June 27, 1970, P 20 31 849.4
Int. Cl. H01m 1/02
U.S. Cl. 136—170                                    10 Claims

ABSTRACT OF THE DISCLOSURE

Leak-proof battery enclosure of thermoplastic synthetic resin, wherein each of the case walls has at its upper edge a pair of upwardly extending spaced-apart lips defining a groove, and the cover has walls matching those of the case. Each of the cover walls has at its lower edge a pair of downwardly extending spaced-apart lips defining a groove having along its base a projecting wedge. The distance between the lips on the cover is such that the grooves in the cover each receive both of the lips of an associated pair. The width of the wedge in the base of the grooves in the cover is such that the wedge forces the upper edges of the lips on the case apart and firmly against the inside of the lips on the cover. The cover has filling holes connecting the upper surface thereof with the groove in the cover and a sealing mass fills the continuous channel formed by the groove in the cover and the lips on the case; the sealing mass is inserted under pressure and urges the major portion of the case lips firmly against the inner faces of the cover lips, thereby sealing the cover to the case. The cover lips may have inwardly projecting beads at the lower extremities, thereby affording mechanical support against accidental removal of the cover from the case.

BACKGROUND OF THE INVENTION

In previous batteries in which it was intended to seal the case to the cover, the case walls have been relatively thick because it was necessary that the groove in the top side of the case walls and accommodating a sealing material, should not be too narrow. When the groove is too narrow, the frictional resistance between the sealing mass and the walls of the channel during injection of the sealing mass is so great that at low injection pressures the groove does not become completely filled, whereas if the injection pressure is increased, then sealing material is forced out of the groove. It has consequently been difficult to prepare properly sealed batteries in such cases where the case walls and the inter-cell walls were not thick enough to be provided with grooves of the requisite width.

SUMMARY OF THE INVENTION

It is an object of the present invention to provide a battery case of synthetic thermoplastic resin material wherein the outer walls and inter-cell walls are relatively thin, thereby effecting a saving in cost and material.

It is another object of the invention to provide a battery case and cover of synthetic thermoplastic resin material wherein the outer walls and inner walls are provided with grooved portions which unite to form a continuous channel into which a sealing mass may be injected to provide an effective seal between the case and the cover.

According to the present invention each of the walls of the battery case is provided at its top with a pair of lips extending upwardly and defining between themselves a groove. Similarly, each of the outer walls and inner walls of the cover is equipped at its bottom edge with a pair of downwardly extending lips. The grooves in the cover walls defined by the downwardly extending lips are sufficiently wide to accept both of the upwardly extending lips of a corresponding case wall. Along the base of the grooves in the cover extends a wedge-like projection; as the case lips are inserted in the cover groove they encounter this projection and are spread apart thereby, with the free edges of the case lips being forced against the inner surfaces of the cover lips. Filling holes are provided in the cover, leading from the outer surface of the cover into the cover groove or grooves. Sealing material is injected through these filling holes to fill the channel or channels formed by the two sets of grooves and, being injected under requisite pressure, to force the case lips apart so that they make contact with the inner surfaces of the cover lips. An effective seal is thereby established between the cover and the case.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is a view similar to FIG. 4, but illustrating another embodiment of the invention.

DESCRIPTION OF THE PREFERRED EMBODIMENTS

Figure 1:
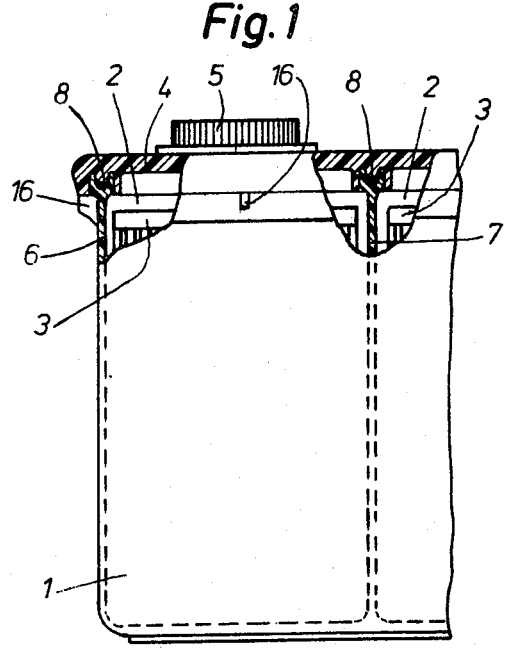
FIG. 1 is a side view of a battery in partial cross-section.

FIG. 1 shows a battery constructed in accordance with the present invention, consisting of a main case portion 1 with cell 2 in which are located a block of plates 3 and an electrolyte (not shown). The cover portion 4 has sealing stoppers 5, as well as inter-cell connectors and terminals which are not shown. The main case portion 1 and the cover portion 4 are sealed to each other by means of an injected hardenable resin 8 which is a thermoplastic material injected into the channel 11 formed by the juxtaposed cooperating grooves 9 and 10. The resin 8 is introduced into the channel 11 by means of an injection molding machine.

The upper edges of the circumferential wall 6, and of any intermediate cell wall 7 if desired, are provided with grooves 10 bounded laterally by the lips 12. The lower edges of the depending corresponding walls on the cover 4 are similarly provided with the grooves 9 each of which defines with one of the grooves 10 a channel 11.

Figure 4:
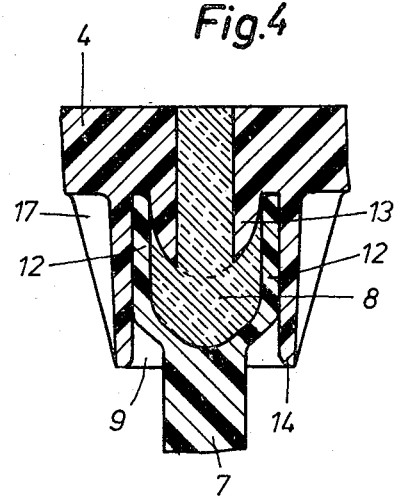
FIG. 4 is a view similar to FIG. 3, but showing the cover seated firmly on the case and the sealing material in place.
Figure 2:
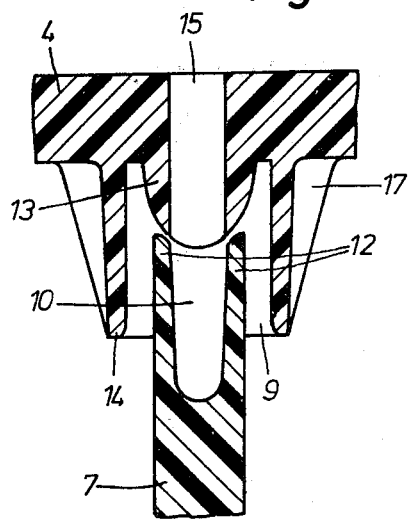
FIG. 2 is a fragmentary cross-sectional detail view of FIG. 1 on an enlarged scale, showing the case lips prior to insertion into the cover groove.
Figure 3:
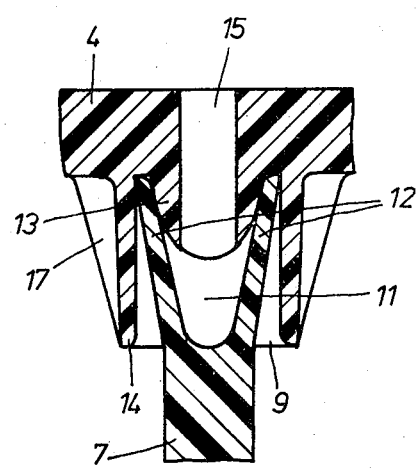
FIG. 3 is a view similar to FIG. 2, but showing the case and cover walls when the cover has been seated on the case and the lips of the case wall have been spread.

FIGS. 2, 3 and 4 show on an enlarged scale a section of the main casing portion and the cover portion prior to, during and after insertion of the lips 12 on the upper free edge of the wall 7 into the groove 9 on the cover 4. FIG. 4 shows the sealing mass 8 in place after its injection through holes 15. FIG. 5 shows a modified embodiment in which the lower edge portions of the lips 14 on cover 4 are provided with inwardly projecting beads 19 which afford mechanical support as well as a tighter seal of the lips 14 with the case wall 7, by engaging the latter exteriorly in retaining relationship with the arcuate faces 20. At 21 the beads 19 are beveled to facilitate insertion of the lips 12 into grooves 9.

This new approach for sealing the cover to the case by means of an injected resin results in a saving in cost and materials, since the case walls 6 and 7 can be thinner than if the seal were made by the known prior-art techniques. Cases made in accordance with this invention have walls 6 and 7 which may be 1.5 mm. thick. The grooves 9 in the cover 4 are substantially wider than the thickness of the case walls 6 and 7. At the base of each cover groove 9 there is provided a wedge-shaped projection 13 which extends parallel to the lips 14 bonding the cover grooves 9 and which spreads apart the lips 12 of the case walls 6 and 7 when inserted into them. The holes 15 extend from the exterior surface of the cover 4 through the projections 13 into the grooves 9 of the cover 4. These channels 15 are used for the injection of the sealing material 8 into the sealing channel 11.

To locate the cover 4 at the right height on the case 1, abutments 16 are provided on the exterior wall 6 of the case. Also, other conventional types of seals by injecting resins may be used in which the case walls 6 fit tightly into the groove of the cover. This type of seal is not shown.

The injected material used for sealing the cover to the case and which is injected through the openings 15 may be polystyrene, polypropylene, polyethylene, or an other thermoplastic resin. The bond formed in the channel 11 is continuous. The lips 14 of the cover 4 are supported by the ribs or abutments 17 of the cover 4.

It will be understood that each of the elements described above, or two or more together, may also find a useful application in other types of constructions differing from the types described above.

While the invention has been illustrated and described as embodied in a battery casing, it is not intended to be limited to the details shown, since various modifications and structural changes may be made without departing in any way from the spirit of the present invention.

What is claimed as new and desired to be protected by Letters Patent is set forth in the appended claims.

What is claimed is:

1. A battery casing, comprising a main casing portion having an upper open side and including wall means having at said upper open side exposed edges provided with respective first grooves open at said upper open side and bounded by lateral wall portions; a cover portion overlying said upper open side and having respective second grooves each facing one of said first grooves and defining a channel therewith, the width of said second grooves exceeding the thickness of said wall means; a projection provided in each of said second grooves extending along the same and projecting into the associated first groove, spreading apart the lateral wall portions bounding such associated first groove; and a hardened sealing material accommodated in said channels filling the same and sealingly uniting said main casing portion and said cover portion.

2. A battery casing as defined in claim 1, wherein both of said portions consist at least predominantly of thermoplastic synthetic material.

3. A battery casing as defined in claim 1, wherein said projection in each of said second grooves is of substantially wedge-shaped cross-sectional configuration.

4. A battery casing as defined in claim 1, wherein said projection in each of said second grooves is of one piece with said cover portion.

5. A battery casing as defined in claim 1, wherein said wall means comprises an outer circumferential wall and at least one intermediate divider wall located within the confines surrounded by said outer circumferential wall.

6. A battery casing as defined in claim 1; and further comprising abutment means on at least one of said portions for determining the extent of maximum penetration of said projections into the respective first grooves.

7. A battery casing as defined in claim 6, wherein said one portion is said main casing portion.

8. A battery casing as defined in claim 1, said second grooves each having an open side facing the respective first groove; and further comprising pairs of beads provided on opposite inner lateral surfaces bounding said second grooves, and each of said beads projecting partially across the respective second groove in the region of said open side thereof in abutment with said wall means.

9. A battery casing as defined in claim 8, said beads having inwardly directed arcuately curved abutment faces abuttingly engaging said wall means in the region of said first grooves.

10. A battery casing as defined in claim 8, said beads being bevelled in direction inwardly of the respective second groove.

References Cited

UNITED STATES PATENTS 3,258,369    6/1966    Blaich _____ 136—170

DONALD L. WALTON, Primary Examiner

U.S. Cl. X.R.

156—69; 220—45; 264—261